United States Patent [19]
Jou

[11] Patent Number: 5,137,042
[45] Date of Patent: Aug. 11, 1992

[54] PREPARATORY MACHINE FOR RECYCLING

[76] Inventor: Tian F. Jou, No. 328, Changlue Rd., Hsishui Hsiang, Changhua Hsien, Taiwan

[21] Appl. No.: 767,077

[22] Filed: Sep. 27, 1991

[51] Int. Cl.⁵ .................. B08B 3/04; B08B 13/00
[52] U.S. Cl. .................................. 134/65; 134/132; 210/403
[58] Field of Search .............. 134/65, 66, 132, 61; 34/8, 58, 59, 128, 135, 136, 137, 142, 179, 182, 183; 209/284, 288, 297; 100/126, 127, 145, 146; 210/383, 403

[56] References Cited

U.S. PATENT DOCUMENTS

| | | | |
|---|---|---|---|
| 865,110 | 9/1907 | Knapp | 34/128 X |
| 1,422,309 | 7/1922 | Schweinsberg et al. | 134/65 |
| 1,510,504 | 10/1924 | Schweinsberg et al. | 134/65 |
| 1,533,997 | 4/1925 | Stinson | 209/284 |
| 2,360,838 | 10/1944 | Atti | 34/128 X |
| 4,073,301 | 2/1978 | Mackinnon | 134/65 |

*Primary Examiner*—Philip R. Coe

[57] ABSTRACT

A preparatory machine for recycling has a first washing device, a second washing device, a drying device, and a collecting device. Pieces of material are washed with detergent-added water in the first cleaning device. Pieces of material then transported to the second washing device by a conveyor screw. The pieces of material are then washed with water in the second washing device. The pieces of material are then dried in the drying device. The dried pieces of material are then collected with the collecting device.

3 Claims, 6 Drawing Sheets

PREPARATORY MACHINE FOR RECYCLING

BACKGROUND OF THE INVENTION

The present invention relates to a preparatory machine for recycling.

Plastics is the most common material being used for industrial products. It is used in a wide variety of products for its light-in-weight property and durability. As a result, plastic waste is large in amount and causes a serious problem of environmental protection. In order to reduce the cost of material and mitigate environmental pollution, it is desired that the plastic waste can be recycled. However, certain procedures need to be taken before recycling.

Generally, the plastic waste needs to be cut or crushed into pieces. The pieces of plastic waste are then plunged in a big pool of water for cleaning purpose. In order to thoroughly clean the pieces of plastic waste, sulfuric or certain chemicals needs to be added to water to help removing residue from the pieces of plastic waste. The processed pieces of plastic waste need to be washed with water to clean out the sulfuric or certain chemicals. The washed pieces of plastic waste need to be dried. The dried pieces of plastic waste are collected for further processes.

Conventionally, after being washed with water, to which sulfuric or certain chemicals is added, the pieces of plastic waste are taken out of the pool and washed with water by human labors. The washed pieces of plastic waste are carried to a drying machine by human labors, too. There is a potential danger that human body might touch the sulfuric or certain chemicals and get hurt. Manual way of processing also limits the speed of processing of plastic waste.

Referring to FIG. 6, a conventional preparatory machine 5 has a conveyor tube which has an inlet 51 and an outlet. The washed pieces of plastic waste are input through the inlet 51 into the conveyor tube. A conveyor screw 52 which is driven by a motor through a pulley conveys the pieces and moves the pieces out of the conveyor tube through the outlet. The pieces fall on an inner surface of a cylinder which is formed with a plurality of apertures 50. The apertured cylinder is attached to a pulley. A motor drives 15 the pulley through a belt, thereby rotating the apertured cylinder, thereby drying the pieces. Two plates 53 are fixed to an outer surface of the conveyor tube. A slot 55 are formed below the plates 53. The dried pieces of plastic waste are directed to a chamber 56. The dried pieces of plastic waste then fall down through an opening 57 to a collector tank 58. Waste water is collected by an outer cylinder 6 and directed out through a hole 61 and a pipe 62.

SUMMARY OF THE INVENTION

It is an object of the present invention to provide a preparatory machine for recycling of plastic waste, which has a lower cleaning device for cleaning pieces of plastic waste.

It is another object of the present invention to provide a preparatory machine for recycling of plastic waste, which has an upper cleaning device for cleaning pieces of plastic waste.

It is still another object of the present invention to provide a preparatory machine for recycling of plastic waste, which has an drying device for drying the pieces of plastic waste.

It is yet another object of the present invention to provide preparatory machine for recycling of plastic waste, which has a housing for collecting dried pieces of plastic waste and directing the waste water out.

These and additional objects, if not specifically set forth herein, will be readily apparent to those skilled in the art from the detailed description of embodiments below, with reference of the accompanying drawings.

The embodiment as shown in the above drawings is used for example only, the present invention is not restricted thereto.

DETAILED DESCRIPTION OF THE PREFERRED EMBODIMENT

Figure 1:
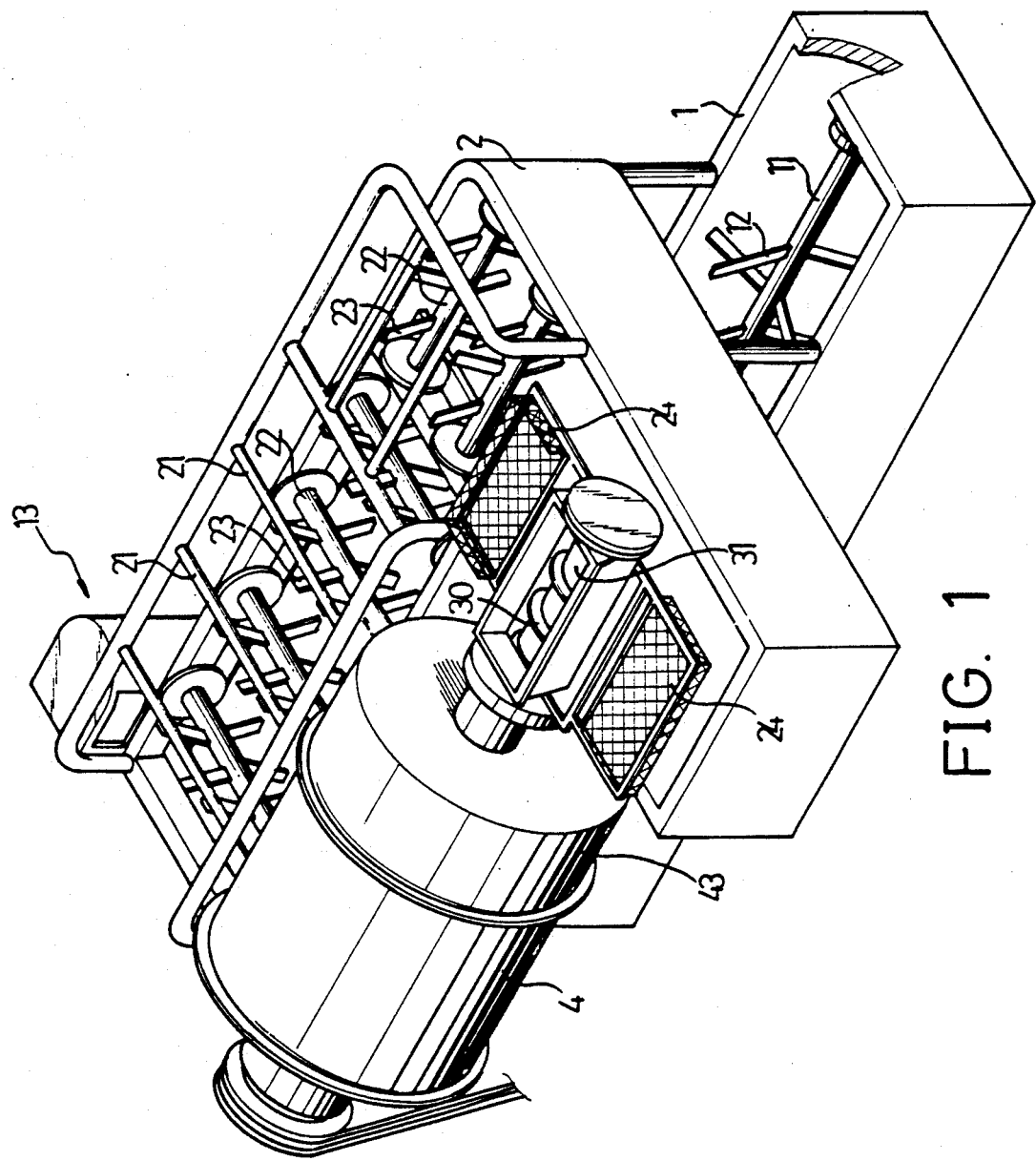
FIG. 1 is a perspective view of a preparatory machine for recycling of plastic waste in accordance with the present invention.
Figure 2:
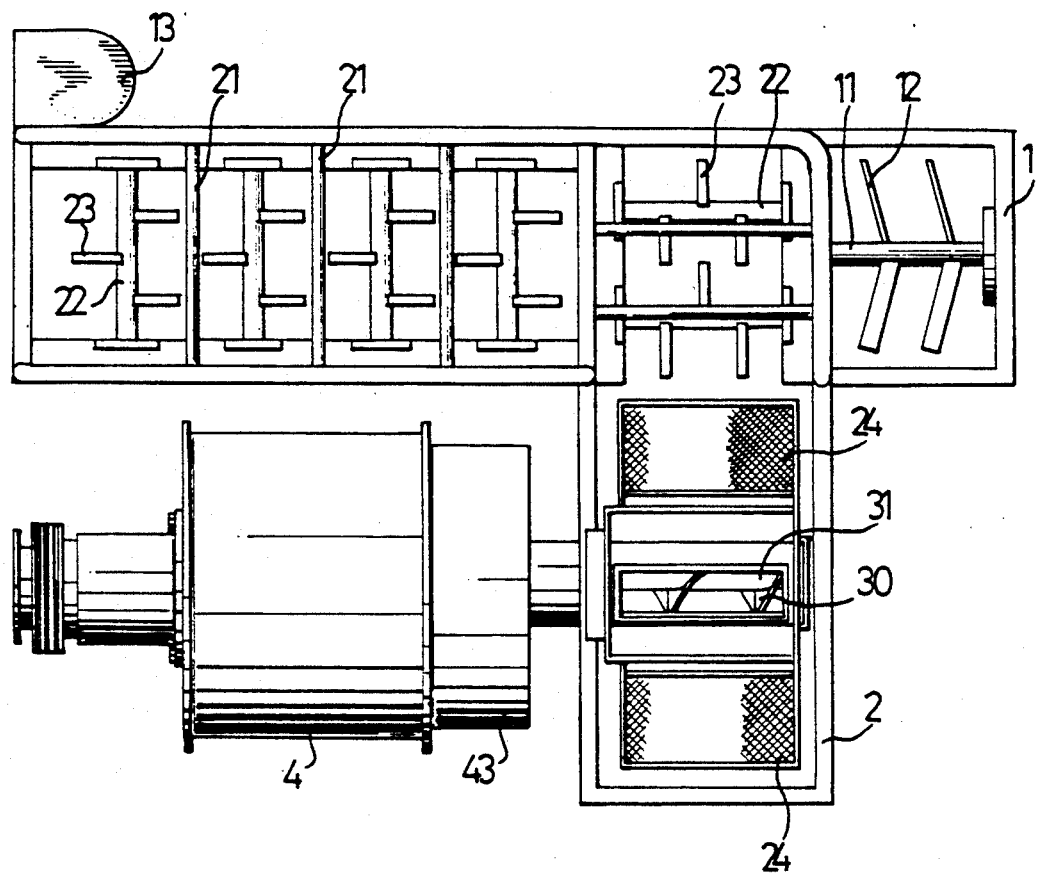
FIG. 2 is a top plane view of a preparatory machine for recycling of plastic waste in accordance with the present invention.

Referring to FIGS. 1 and 2, in accordance with a preferred embodiment of the present invention, a preparatory machine for recycling of plastic waste has a lower cleaning device 1, an upper cleaning device 2, a drying device 3, and a collecting device 4.

Figure 3:
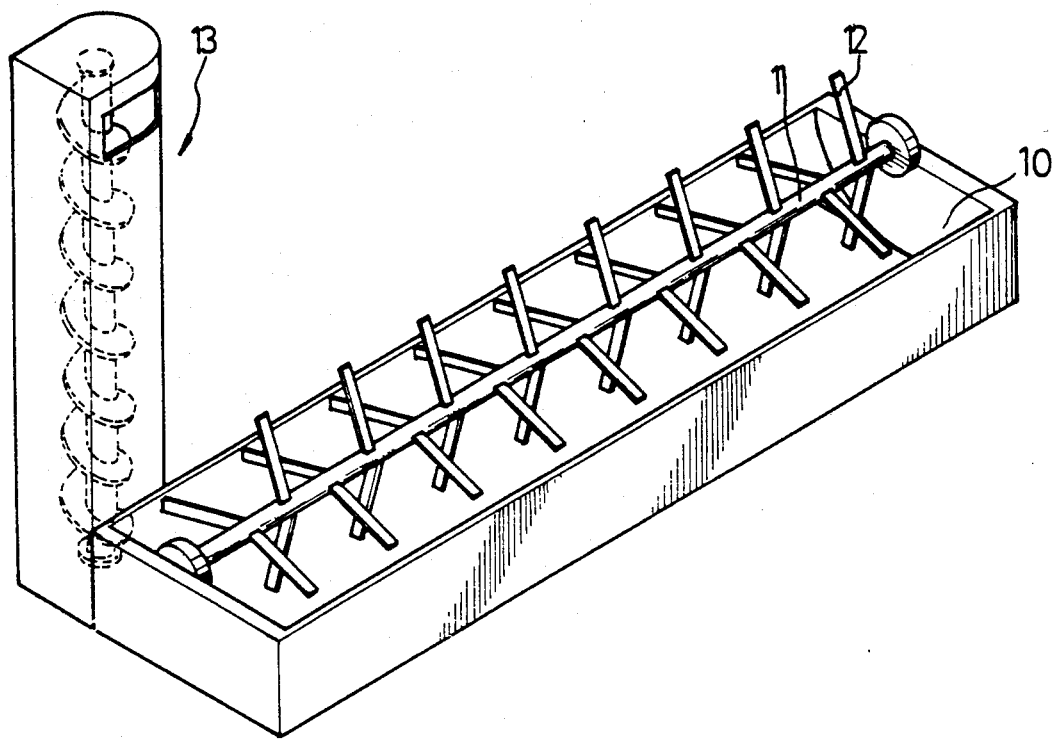
FIG. 3 is a perspective view of a lower cleaning device in accordance with the present invention.

Referring to FIG. 3, the lower cleaning device 1 has a channel 10, a shaft 11, a plurality of blades 12, and a vertical conveyor screw 13.

The channel 10 has a semi-cylindrical inner surface, a first end, and a second end.

The shaft 11 is arranged along a length of the channel 10. The shaft 11 can rotate on the channel 10.

Each of the blades 12 has a first end being attached to the shaft 11 and a second end working as a free end. The free end of the blade 12 is just above the inner surface of the channel 10.

A conveyor tube is vertically mounted on the second end of the channel 1?. The conveyor tube has an inlet at its bottom and an outlet at its top. The inlet of the conveyor tube communicates with the second end of the channel 10. The conveyor screw 13 is enclosed within the conveyor tube.

Figure 4:
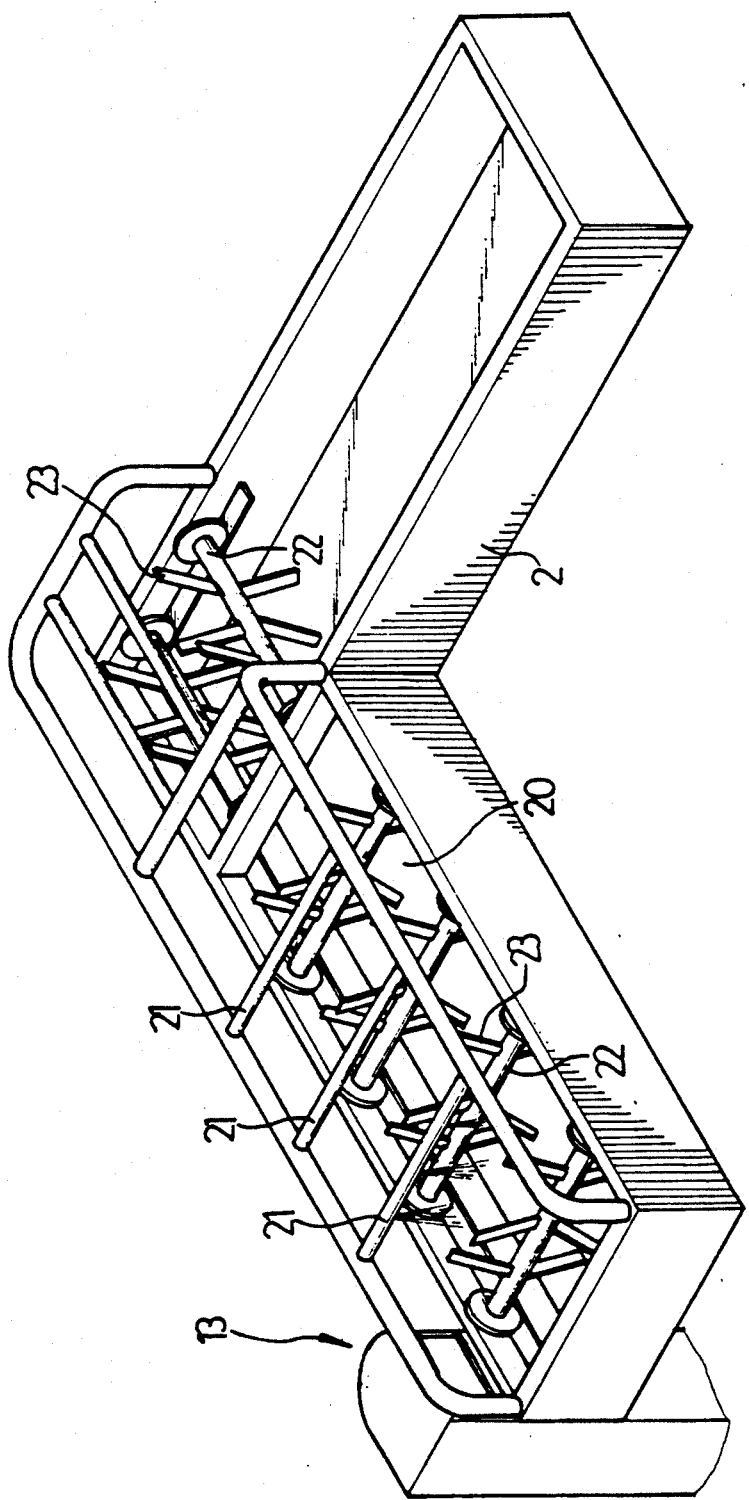
FIG. 4 is a perspective view of an upper cleaning device in accordance with the present invention.

Referring to FIGS. 1, 2, and 4, the upper cleaning device 2 has a L-shaped channel 20, pipes 21, a plurality of shafts 22, blades 23, and filters 24.

The channel 20 has a first portion and a second portion. The first portion of the channel 20 is parallel to the channel 10. The second portion of the channel 20 is perpendicular to the first portion of the channel 20.

The pipes 21 has down-facing nozzles (not shown).

The shafts 22 are transverse to the first portion and the second portion of the channel 20.

The blades 23 are fixed to each shaft 22.

The filters 24 are rotatably mounted on the second portion of the channel 20. Each filter 24 has a bottom net and three side nets.

Figure 5:
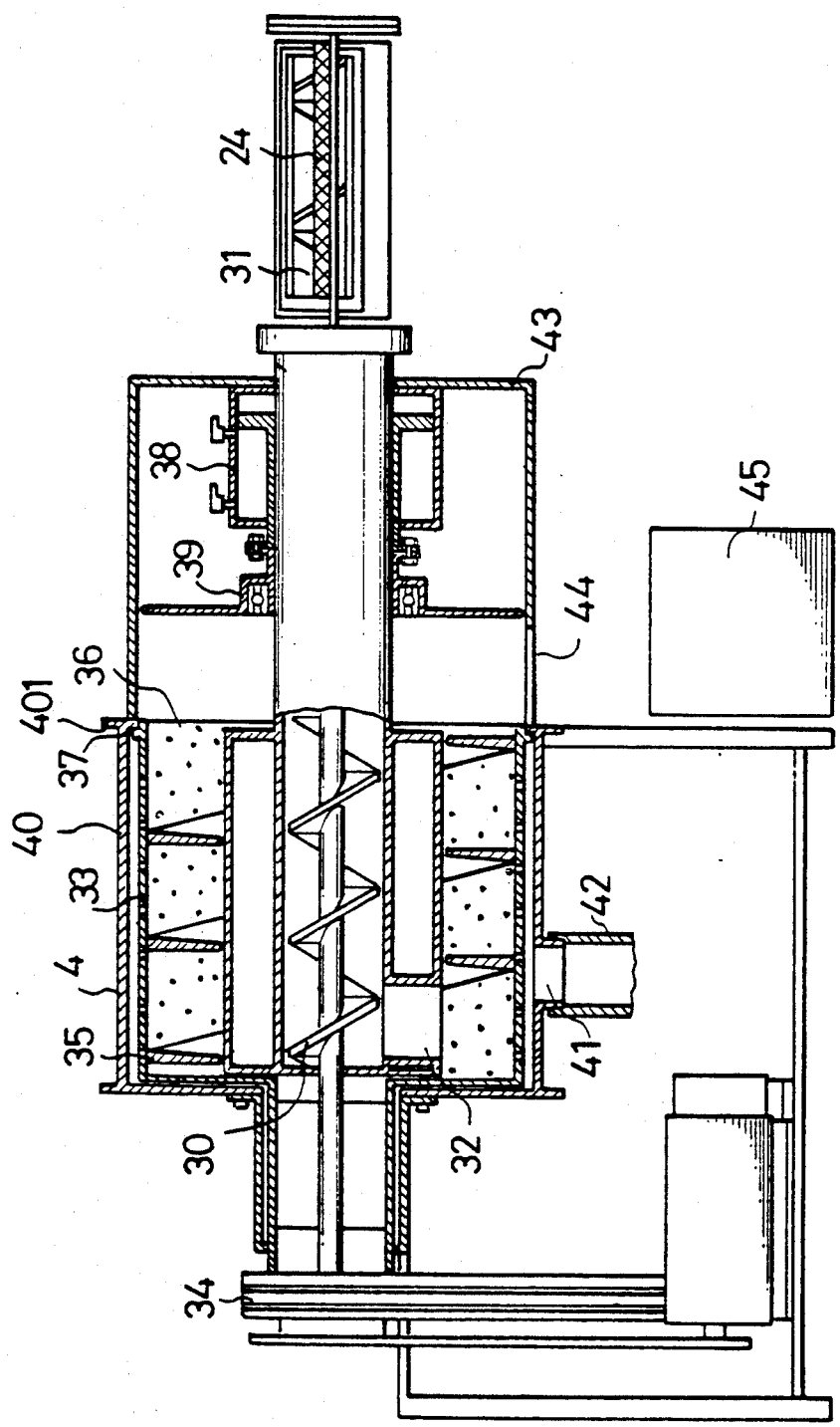
FIG. 5 is a partial cross-sectional view of a drying device in accordance with the present invention.
Figure 6:
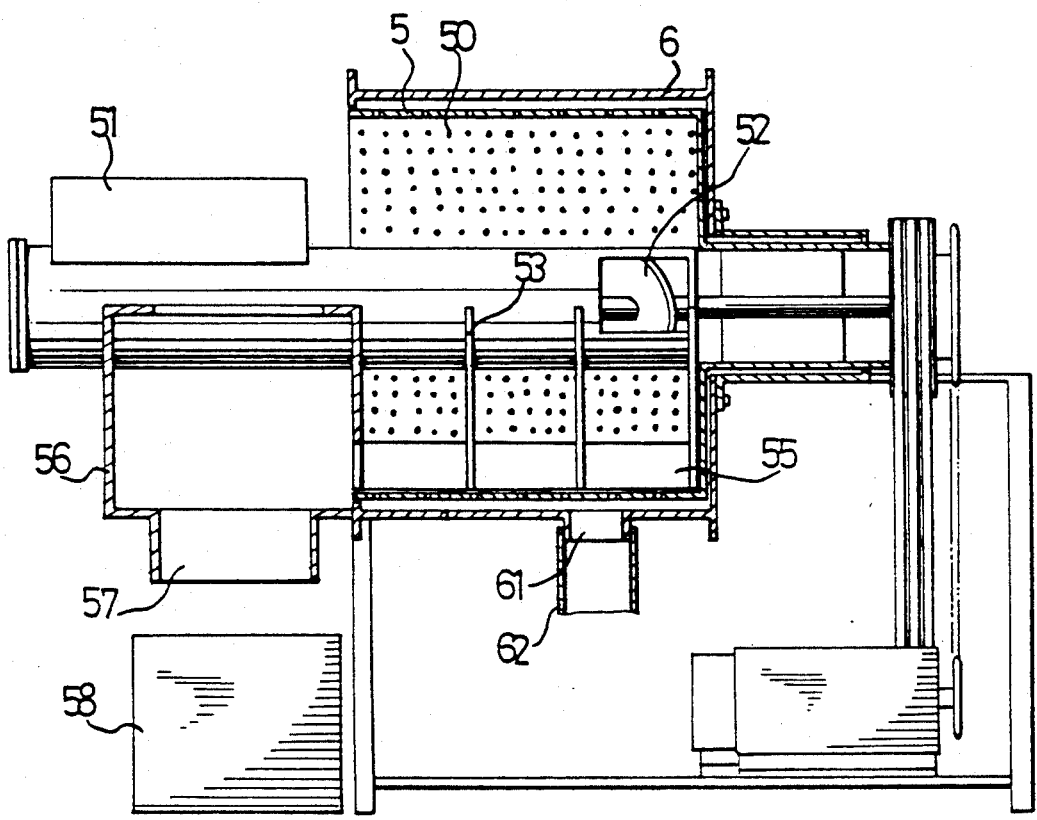
FIG. 6 is a drying device in accordance with prior art.

Referring to FIG. 5, a drying device 3 has a conveyor screw 30, a conveyor tube which has an inlet 31 and an outlet 32, a cylinder which has a plurality of apertures 33, a hydraulic device 38, and a cover 39.

The cylinder encloses the conveyor tube. A pulley 34 is fixed to a first end of the conveyor tube. A screw 35 is formed on an inner surface of the apertured cylinder. A second end of the apertured cylinder defines an opening 36. A flange 37 extends around the opening 36.

A collecting device 4 has a first section 40 and a second section 43. The first section 40 of the collecting device 4 encloses the apertured cylinder. The first section 40 has a flange 401 extending around an opening thereof and a waste water outlet 41 communicating with a pipe 42. The flange 401 contacts the flange 37 of the apertured cylinder. The second section 43 has an outlet 44 directing the dried pieces of plastic waste out.

Water and chemical detergent is filled in the channel 10. Pieces of plastic waste are then plunged in the channel 10 from the first end of the channel 10. When the shaft 11 rotates the blades 12 help washing the pieces of plastic waste and conveying the pieces of plastic waste toward the second end of channel 10. The pieces of plastic waste are then moved through the inlet of the conveyor tube into the conveyor tube. The pieces of plastic waste are moved upward by the vertical conveyor screw 13. The pieces of plastic waste are then moved out of the conveyor tube through the outlet of the conveyor tube.

The pipes 21 transmit water above the channel 20. The nozzles of the pipes 21 spray water downward to clean the pieces of plastic waste. The shafts 2 rotate the blades 23, so that blades 23 help cleaning and transmitting the pieces of plastic waste. The pieces of plastic waste are transmitted from the first portion to the second portion of the channel 20. The filters 24 ar rotated around the inlet 31 of the conveyor tube, thereby taking the pieces of plastic waste from the channel 20. When the filters 24 are tilted to a certain extent, the pieces of plastic waste slide from the filters into the inlet 31.

The pieces of plastic waste are transmitted from the inlet 31 through the conveyor to the outlet 32 by the conveyor screw 30. The pieces of plastic waste fall on an inner surface of the apertured cylinder. The apertured cylinder is rotated, waste water is tossed through the apertures 33 out of the apertured cylinder by centrifugal force. As a result, the pieces of plastic waste are dried. The screw 35 helps transmitting the pieces of plastic waste toward the opening 36.

Referring to FIG. 5, the hydraulic device 38 is arranged around the conveyor screw device 31. The cover 39 is urged by the hydraulic device 38 to seal the opening 39. If washed feather is to be dried with the preparatory machine in accordance with the present invention, the cover 39 is urged by the device 38 to seal the opening 36. The apertured cylinder is rotated at a relatively low speed while washed feather is being carried into the apertured cylinder. After a predetermined amount of feather has been lodged in to the apertured cylinder, the lodgement is ceased. The apertured cylinder is then rotated at a relatively high angular speed to dry the washed feather to a desired extent. After this, the cover 39 is urged from the opening 36 by the hydraulic device 38, so that the dried feather is allowed to pass through the opening 36 and hole 44 and fall into the collector tank 45.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A preparatory machine for recycling, comprising:
   (a) a first cleaning device having a channel with a first end and a second end for washing pieces of material with detergent-added water and transporting the pieces of material from said first end to said second end thereof;
   (b) a second cleaning device having a first end communicating with said second end of said first cleaning device and a second end, said second cleaning device being adapted to wash the pieces of material received from said first cleaning device with pure water and to transport the pieces of material from said first end to said second end thereof;
   (c) a drying device comprising a conveyor tube having an inlet for receiving the pieces of material from said second end of said second cleaning device and an outlet for allowing the pieces of material to pass thereout, a conveyor screw extending concentrically within said conveyor tube for transporting the pieces of material from said inlet to said outlet of said conveyor tube, and an apertured cylinder concentrically rotating around said conveyor tube and having a generally cylindrical wall with an opening and a helical screw extending on the inner surface of said cylindrical wall for transporting the pieces of material from said conveyor tube outlet toward said opening thereof when said apertured cylinder is rotated to dry the pieces of material; and
   (d) a collecting device having a first section enclosing said apertured cylinder for collecting waste water, said first section having an outlet therein for discharging the waste water therefrom, said collecting device also having a second section mating with said first section for receiving the pieces of material from said opening of said apertured cylinder and having an outlet for discharging the pieces of material into an associated collection vessel.

2. A machine in accordance with claim 1, including a gate actuatable by a hydraulic pressure cylinder to close said opening of said apertured cylinder.

3. A machine in accordance with claim 1, including two filters rotatably mounted around said inlet of said conveyor tube for straining the pieces of material from said second end of said second washing device and directing the pieces of material into said inlet of said conveyor tube.

* * * * *